US008825589B2

(12) United States Patent
Baudel et al.

(10) Patent No.: US 8,825,589 B2
(45) Date of Patent: *Sep. 2, 2014

(54) RULE CORRELATION TO RULES INPUT ATTRIBUTES ACCORDING TO DISPARATE DISTRIBUTION ANALYSIS

(75) Inventors: Thomas Baudel, Paris (FR); Frank Van Ham, Geldrops (NL)

(73) Assignee: International Business Machines Corporation, Armonk, NY (US)

( * ) Notice: Subject to any disclaimer, the term of this patent is extended or adjusted under 35 U.S.C. 154(b) by 249 days.

This patent is subject to a terminal disclaimer.

(21) Appl. No.: 13/406,896

(22) Filed: Feb. 28, 2012

(65) Prior Publication Data

US 2013/0103636 A1    Apr. 25, 2013

Related U.S. Application Data

(62) Division of application No. 13/280,594, filed on Oct. 25, 2011.

(30) Foreign Application Priority Data

Oct. 21, 2011 (EP) .................................. 11306366

(51) Int. Cl.
*G06F 9/44* (2006.01)
(52) U.S. Cl.
USPC .......................................................... 706/52
(58) Field of Classification Search
None
See application file for complete search history.

(56) References Cited

U.S. PATENT DOCUMENTS

| 6,711,577 | B1* | 3/2004 | Wong et al. ................... 707/694 |
| 8,224,761 | B1* | 7/2012 | Rockwood ....................... 706/47 |
| 2003/0014420 | A1* | 1/2003 | Jessee et al. ................... 707/101 |
| 2003/0074439 | A1* | 4/2003 | Grabarnik et al. ............ 709/224 |
| 2007/0094066 | A1* | 4/2007 | Kumar et al. .................... 705/10 |
| 2010/0131506 | A1* | 5/2010 | Shintani et al. ................ 707/737 |
| 2010/0223211 | A1* | 9/2010 | Johnson et al. .................. 706/11 |
| 2010/0250535 | A1* | 9/2010 | Loftus et al. ................... 707/736 |
| 2011/0010209 | A1* | 1/2011 | McNally ........................... 705/7 |
| 2013/0073511 | A1* | 3/2013 | Baudel et al. .................... 706/60 |

OTHER PUBLICATIONS

Brijs et al, Defining interestingness for association rules, 2003.*
Hofmann et al, Visualizing Association Rules with Interactive Mosaic Plots, 2000.*
Wong et al, Visualizing Association Rules for Text Mining, 1999.*

* cited by examiner

*Primary Examiner* — Jeffrey A Gaffin
*Assistant Examiner* — Mikayla Chubb
(74) *Attorney, Agent, or Firm* — Steven M. Greenberg, Esq.; CRGO Law

(57) ABSTRACT

Embodiments of the present invention provide a method, system and computer program product for visualizing rule input attributes with a rule according to disparate rule attribute distributions. In an embodiment of the invention, a method for visualizing rule input attributes with a rule according to disparate rule attribute distributions has been provided. The method includes identifying in response to a selection of a rule for viewing in a rule viewer an input for the selected rule and determining an attribute for the input. However, attributes present in a guard for the selected rule can be excluded. The method also can include computing a global distribution of the attribute irrespective of the identified input and a specific distribution for the identified input. The attribute can be flagged as being correlated with the selected rule when it is determined that a sufficient disparity exists between the global distribution and the specific distribution.

4 Claims, 1 Drawing Sheet

RULE CORRELATION TO RULES INPUT ATTRIBUTES ACCORDING TO DISPARATE DISTRIBUTION ANALYSIS

CROSS-REFERENCE TO RELATED APPLICATIONS

This application is a Divisional of U.S. application Ser. No. 13/280,594, filed Oct. 25, 2011, currently pending, which claims priority to European Application No. 11306366.3, filed Oct. 21, 2011, which is incorporated herein by reference in its entirety.

BACKGROUND OF THE INVENTION

1. Field of the Invention

The present invention relates to the dynamic assembly of rules in a business rules management system (BRMS) and more particularly to collaborative rule editing in a BRMS.

2. Description of the Related Art

A business rule management system (BRMS) is a software system used to define, deploy, execute, monitor and maintain the variety and complexity of decision logic that is used by operational systems within an organization or enterprise. The decision logic, namely "business rules", includes policies, requirements, and conditional statements that are used to determine the tactical actions that take place in applications and systems. At the minimum, a BRMS includes a repository, allowing decision logic to be externalized from core application code, tools that allow both technical developers and business experts to define and manage decision logic, and a runtime environment in which applications can invoke decision logic managed within the BRMS and execute the decision logic using a business rules engine.

In a typical BRMS, one or more rules in a rule set are selected according to matching criteria (or exclusionary criteria), also known as a "guard" for an input. The selected rules then are applied once to the input and this process is repeated for all inputs offered to the system. As the rules are applied, and any output resulting from the application generated, the rules can be removed from consideration until none of the selected rules remain to be applied. Thus, to the extent rules can be modified by the end user, the use of a BRMS has been found to reduce or remove reliance on information technology (IT) departments for changes in live systems. The use of a BRMS also has been found to provide increased control over implemented decision logic for compliance and better business management, and also the ability to express decision logic with increased precision, using a business vocabulary syntax and graphical rule representations such as decision tables, trees, scorecards and flows. Finally, the use of a BRMS has been found to improve efficiency of processes through increased decision automation.

In a BRMS, like traditional middleware, multiple different users can collaboratively contribute modules of application logic, for instance, to enforce a business policy, automate a process, instantiate a transaction or produce a tangible result. These modules, referred to in the art as "execution units", are dynamically assembled by middleware software components and executed to form a single enterprise application program. Importantly, collaborative business rule editing environments like a BRMS allow business users to independently edit business rules including specifying the inputs requisite to the application of the edited business rules.

Of note, with respect to a changed rule, current BRMS systems provide little sense of the relationship between context of rule inputs requisite to applying the rule in the BRMS and the rule itself. While the importance of some contextual attributes such as individual demographics can be gleaned from the collection of all inputs for the rules, in many instances the context will remain hidden when considering only one or a handful of inputs for rules of interest. In particular, when limiting an analysis to only a subset of rule inputs for a selected rule, the context may vary from the norm for all inputs. Yet, this type of information typically cannot directly be displayed in the rule editing environment, where it would be of the most beneficial to the end user.

BRIEF SUMMARY OF THE INVENTION

Embodiments of the present invention address deficiencies of the art in respect to collaborative rule editing and provide a novel and non-obvious method, system and computer program product for visualizing rule input attributes with a rule according to disparate rule attribute distributions. In an embodiment of the invention, a method for visualizing rule input attributes with a rule according to disparate rule attribute distributions has been provided. The method includes, in response to the selection of a rule for viewing in a rule viewer (such as a rule editor or rules analysis tool) executing in memory of a computer, identifying one or more inputs that have triggered the application of the selected rule from the datastore. Thereafter, for each identified input, one or more attributes can be determined from the historical rule datastore. However, attributes present in a guard for the selected rule can be excluded. Thereafter, a global distribution of at least one of the attributes can be computed for all inputs in the datastore, irrespective of the identified input. Finally, the attribute can be flagged as being correlated with the selected rule when it is determined that a sufficient disparity exists between the global distribution and the specific distribution.

In one aspect of the embodiment, a sufficient disparity exists when a probability of the specific distribution being derived from a random sampling of the global distribution is small below a threshold value. For example, a sufficiently small probability of the specific distribution having been derived from a random sampling of the global distribution can be determined according to a chi square test of independence.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for visualizing rule input attributes with a rule according to disparate rule attribute distributions. In accordance with an embodiment of the invention, a decision warehouse of attributes for rule inputs for rules in a rules management system such as a BRMS can be accessed to compute different global distributions for different ones of the attributes irrespective of a given one of the rule inputs. A rule amongst the rules can be selected for editing in a rules editor for the rules management system and the inputs for the selected rule can be determined. A distribution for each attribute specific to the rule inputs can be computed (with any attributes present in a guard for the selected rule excluded) and compared to corresponding global distributions for the attributes computed irrespective of the inputs. Computed distributions for the attributes of the inputs of the selected rule that differ from the corresponding global distributions by a threshold margin can be noted and a correlation between those attributes and the selected rule can be displayed in the rules editor so as to denote to the end user the relevance of the correlated attributes to the selected rule edited by the end user in the rules editor.

Figure 1:
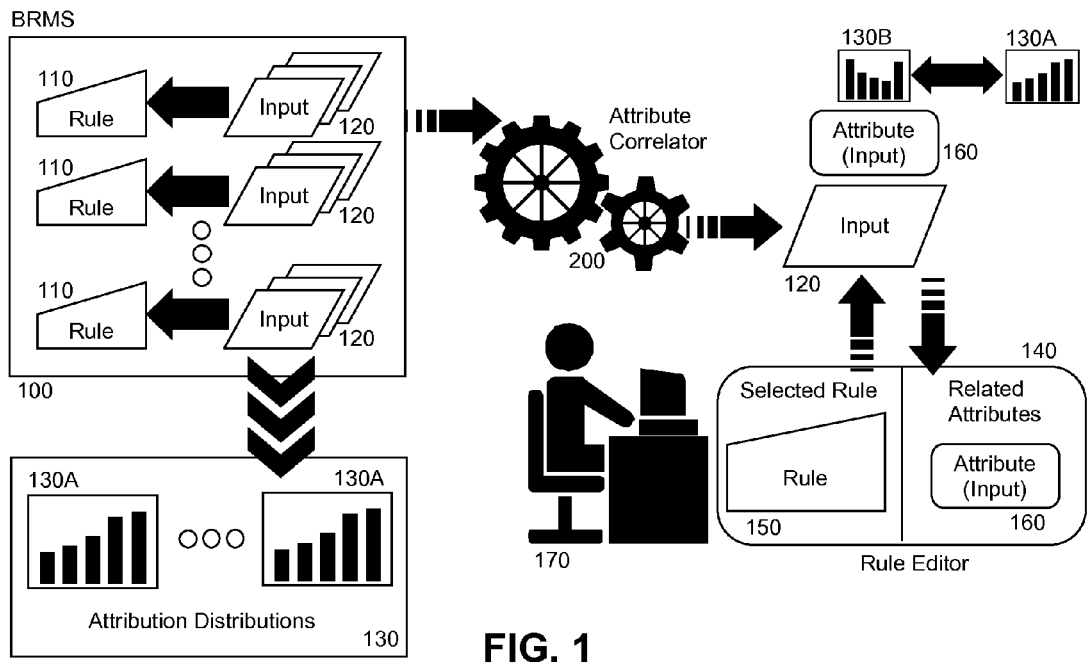
FIG. 1 is a pictorial illustration of a process for visualizing rule input attributes with a rule according to disparate rule attribute distributions.

In further illustration, FIG. 1 pictorially shows a process for visualizing rule input attributes with a rule according to disparate rule attribute distributions. As shown in FIG. 1, each input 120 within a provided set of one or more inputs 120, depending upon a guard for the input 120, can trigger the application of one or more different rules 110 in a BRMS 100. Each of the different inputs 120 can implicate different attributes, such as the demographics for a population of individuals. Examples can include income, age or product preference, to name only a few. Further, a set of global attribute distributions 130 can be computed, the set 130 including a global distribution 130A for each of the attributes irrespective of a particular one of the inputs 120.

Of note, an attribute correlator 200 can process in response to a selection of a rule 150 by an end user 170 in a rule editor 140, a particular one of the inputs 120 for the selected rule 150 to identify one or more corresponding attributes 160. The attribute correlator 200 further can compute an input specific attribute distribution 130B specific to the particular one of the inputs 120. The attribute correlator 200 yet further can compare the input specific attribute distribution 130B to a corresponding global distribution 130A for the attribute 160 to determine if a threshold disparity exists. For instance, the threshold disparity can be determined based upon computing a low enough probability that the input specific attribute distribution 130B could be derived from a random sampling of the corresponding global distribution 130A. Finally, to the extent that the attribute correlator 200 determines a threshold disparity for the input specific attribute distribution 130B and the corresponding global distribution 130A, the attribute correlator 200 can flag the attribute 160 as being correlated to the selected rule 150 in the rule editor 140.

Figure 2:
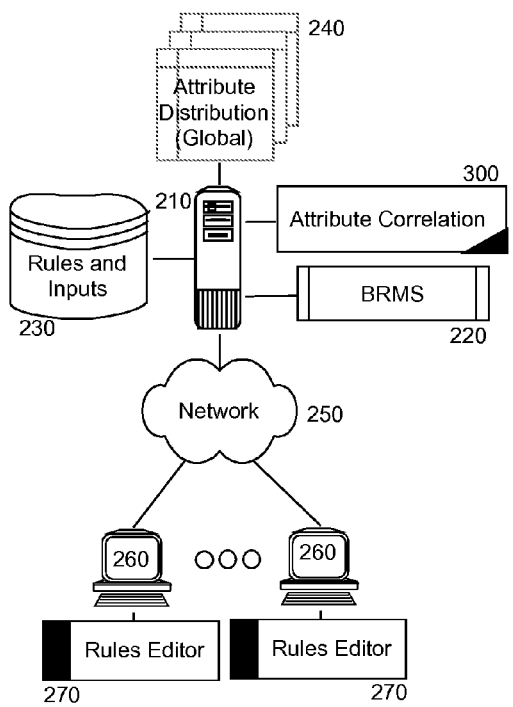
FIG. 2 is a schematic illustration of a BRMS configured for visualizing rule input attributes with a rule according to disparate input attribute distributions; and, FIG. 3 is a flow chart illustrating a process for visualizing rule input attributes with a rule according to disparate rule attribute distributions.

The process described in connection with FIG. 1 can be implemented in a BRMS. In yet further illustration, FIG. 2 schematically shows a BRMS configured for visualizing rule input attributes with a rule according to disparate rule attribute distributions. The system can include a host server 210 with at least one processor and memory communicatively coupled to different client computers 260 over a computer communications network 250. The host server 210 can support the execution of a rules management system such as a BRMS 220. The BRMS 220 in turn can be configured to apply different rules according to different inputs set forth in data store 230. In this regard, the rules in the data store 230 can be edited by way of a rules editor 270 executing in a client computing device 260.

Of note, attribute correlation module 300 can be coupled to the BRMS 220. The module 300 can include program code enabled upon execution in the memory of the host server 210 to respond to a selection of a rule in a rules editor 270 by identifying an attribute for a set of inputs to the selected rule and by retrieving from a selection of global distributions 240 an attribute distribution for the identified attribute. The program code additionally can be enabled to compute an attribute distribution for the identified attribute limited to the input for the selected rule and to compare the computed distribution to the retrieved distribution. To the extent that the distributions are sufficiently disparate, the program code of the module 300 can be enabled to flag the identified attribute in the rules editor 270 as being correlated with the selected rule.

Figure 3:
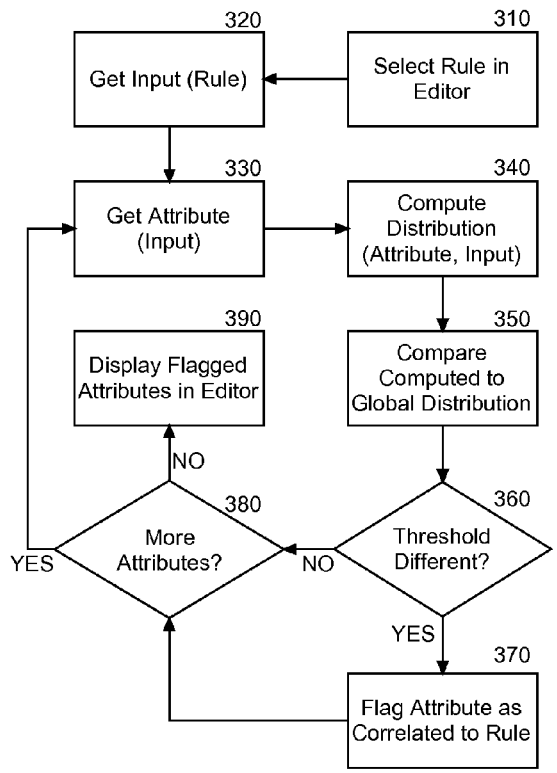

In even yet further illustration of the operation of the attribution correlation module 300, FIG. 3 is a flow chart illustrating a process for visualizing rule input attributes with a rule according to disparate rule attribute distributions. Beginning in block 310, a rule can be selected in a rule editor and in block 320 an input can be identified for the rule. In particular, the rule can be specified as "perform action when (input)" or "if (input) perform action". In block 330, an attribute can be selected for association with the identified input, however, attributes associated with a guard for the selected rule can be excluded. In block 340, a distribution can be computed for the attribute limited to the constraint of the input. In block 350, the computed distribution can be compared to a global distribution for the attribute unconstrained by the input.

In decision block 360, it can be determined if the computed distribution is sufficiently different than the global distribution. In this regard, the computed distribution can be considered sufficiently different from the global distribution when it is determined that the probability that the computed distribution could have been derived from a random sampling of the global distribution is small. To with, a chi square test of independence can be applied to compute the probability. If it is determined that the computed distribution is sufficiently different than the global distribution, in block 370 the attribute can be flagged in the rule editor as being correlated to the selected rule. Thereafter, in decision block 380, if additional attributes remain to be processed, the process can repeat through block 330. When no additional attributes remain to be processed, in block 390 the flagged attributes can be displayed in the rule editor in connection with the selected rule.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for visualizing rule input attributes with a rule according to disparate rule attribute distributions, the method comprising:
- identifying in response to a selection of a rule for viewing in a rule viewer executing in memory of a computer, an input for the selected rule;
- determining an attribute for the input;
- computing a global distribution of the attribute irrespective of the identified input and a specific distribution for the identified input; and,
- flagging the attribute as being correlated with the selected rule responsive to determining a sufficient disparity between the global distribution and the specific distribution.

2. The method of claim 1, further comprising excluding an attribute from consideration present in a guard for the rule.

3. The method of claim 1, wherein a sufficient disparity exists when a probability of the specific distribution being derived from a random sampling of the global distribution is small below a threshold value.

4. The method of claim 3, wherein the probability is determined according to a chi square test of independence.

* * * * *